(12) United States Patent
Price (10) Patent No.: US 10,548,294 B1
(45) Date of Patent: Feb. 4, 2020

(54) FOOD RISER (71) Applicant: David H. Price, Venice, FL (US)

(72) Inventor: David H. Price, Venice, FL (US)

( * ) Notice: Subject to any disclaimer, the term of this patent is extended or adjusted under 35 U.S.C. 154(b) by 0 days.

(21) Appl. No.: 16/350,720

(22) Filed: Dec. 24, 2018

(51) Int. Cl.
A01K 5/01 (2006.01)
A01K 7/00 (2006.01)
F16M 11/04 (2006.01)
F16M 11/20 (2006.01)

(52) U.S. Cl.
CPC .............. A01K 5/0114 (2013.01); A01K 7/00 (2013.01); F16M 11/04 (2013.01); F16M 11/2092 (2013.01)

(58) Field of Classification Search
CPC ..... A47B 96/027; A01K 5/0114; F16M 11/04
USPC .................................................. 108/108, 152
See application file for complete search history.

(56) References Cited

U.S. PATENT DOCUMENTS

| | | | | | |
|---|---|---|---|---|---|
| 1,273,397 | A | * | 7/1918 | Neil | A47B 57/16 108/110 |
| 1,802,245 | A | * | 4/1931 | Foretich | A47B 57/10 108/186 |
| 3,081,718 | A | * | 3/1963 | Shoffner | A47B 96/04 108/108 |
| 4,117,825 | A | * | 10/1978 | Robertson | A47J 37/0772 108/152 |
| 4,205,629 | A | * | 6/1980 | Wix | A01K 5/0114 119/51.5 |
| 4,233,912 | A | * | 11/1980 | Ferdinand | A47B 57/10 108/109 |
| 4,548,193 | A | * | 10/1985 | Marogil | A47J 37/0763 126/30 |
| 4,976,223 | A | * | 12/1990 | Pierce | A01K 5/0114 119/61.56 |
| 5,074,422 | A | * | 12/1991 | Holtz | A47B 57/10 108/108 |
| 5,272,991 | A | * | 12/1993 | Carrigan, Jr. | A47B 87/0207 108/108 |
| 5,365,860 | A | * | 11/1994 | Billington, III | A47C 9/025 108/108 |
| 5,483,903 | A | * | 1/1996 | Pierce | A47B 9/04 108/108 |
| 5,501,176 | A | * | 3/1996 | Tully | A01K 5/0114 119/61.57 |
| 5,531,168 | A | * | 7/1996 | Towfigh | A47B 17/02 108/108 |
| 5,702,158 | A | * | 12/1997 | Mengshoel | A47B 57/26 108/106 |
| D394,360 | S | * | 5/1998 | Geier | D34/21 |
| 6,935,523 | B2 | * | 8/2005 | Ahn | A47F 5/137 211/189 |
| 7,634,973 | B1 | | 12/2009 | Cribb et al. | |
| 8,074,815 | B2 | * | 12/2011 | Gerstner | A61B 50/26 211/193 |

(Continued)

Primary Examiner — Jose V Chen
(74) Attorney, Agent, or Firm — Robert J. Lauf (57) ABSTRACT A food riser for supporting food or water bowls for an animal includes: a horizontal platform; a vertical supporting stand having vertical and horizontal members defining a plurality of slots at various heights into which the platform can be inserted, and further having forwardly-extending feet of a length sufficient to stably support the weight of the horizontal platform in cantilever fashion; and, a moment-resistant means of securing the platform in a selected slot in the vertical supporting stand.

10 Claims, 11 Drawing Sheets (56) References Cited

U.S. PATENT DOCUMENTS

| | | | |
|---|---|---|---|
| 8,172,347 B2 * | 5/2012 | Lim | F25D 25/02 |
| | | | 108/106 |
| 8,479,686 B2 | 7/2013 | Johnson | |
| 8,516,975 B2 | 8/2013 | Becattini et al. | |
| 8,776,725 B1 | 7/2014 | Grijalva | |
| 9,485,959 B2 | 11/2016 | Lucky | |
| 9,644,786 B2 * | 5/2017 | Steiner | F16M 11/28 |
| D800,396 S * | 10/2017 | Coviello | D30/133 |
| 9,907,290 B2 | 3/2018 | Jeglia | |
| 10,149,456 B2 | 12/2018 | Diamond | |
| 10,412,929 B2 * | 9/2019 | Kasper | A47B 5/00 |
| 2004/0211741 A1 * | 10/2004 | Bustos | A47F 5/0018 |
| | | | 211/187 |
| 2014/0198490 A1 * | 7/2014 | Halseth | A47F 11/10 |
| | | | 362/147 |
| 2018/0070557 A1 | 3/2018 | Uhl | |
| 2018/0132613 A1 * | 5/2018 | Hsieh | A47J 47/00 |
| 2018/0352954 A1 * | 12/2018 | Keenan | A47F 5/0846 |

\* cited by examiner

FOOD RISER

BACKGROUND OF THE INVENTION

Field of the Invention

The invention pertains to apparatus and methods for feeding animals, and more particularly to adjustable supports adaptable to feeding animals of different sizes.

Description of Related Art

Food and water bowls for domestic animals, particularly dogs, are normally placed on the floor so that the animal can lap the contents conveniently. However, it is often desirable to locate such bowls at some height above the floor, e.g., to accommodate a very large or deep-chested animal. Placing food and water on an elevated riser is also helpful for dogs with digestive issues and in older dogs that suffer from arthritis. It is further desirable to allow the height to be adjustable by the user, either to accommodate a single animal as it grows, to accommodate a new animal larger or smaller than a previous pet, or simply to find the height that is most comfortable for the animal.

Various accessories have been developed in an attempt to address this problem.

In U.S. Pat. No. 10,149,456 to Diamond, a vertically moving pet bowl apparatus has a vertical tower having a first support column and a second support column. A movable tray may be secured to and located between the first and second support column. The movable tray has a plurality of openings for receiving at least one pet food bowl and/or a water bowl. The movable tray moves vertically between the first and the second support columns so that a user can access the movable tray in the up position and then lower the movable tray to the lower position wherein the pet may gain access. The apparatus allows the user to avoid bending down to provide food/water to the pet and instead allows a user to deliver food and water to the pet from an upright standing position. A top console controls the movement of the movable tray in the up and down position.

In U.S. Pat. No. 9,907,290 to Jeglia, a Multi-Level Pet Table has a lower plate, a lower cover upon the lower plate, four legs upon corners of the lower plate, an upper plate connecting to the four legs upon its corners, an upper cover upon the upper plate opposite the legs, and two junior tables. A felt joins to the lower plate opposite the lower cover thus preventing scratches. The lower plate and the upper plate have generally rectangular flat, planar forms and a generally mutually parallel orientation. The four legs also have a generally mutually parallel and spaced apart orientation. Each of the legs has a firm mechanical connection to the lower plate and the upper plate. And a cushion adheres between the lower plate and the felt limiting the mechanical connection abrading a supporting surface. The junior tables then provide platforms for bowls so pets eat simultaneously while separated vertically.

U.S. Pat. Appl. Pub. 2018/0070557 to Uhl, describes a feeding apparatus for allowing an animal to eat and/or drink from a position at which the animal's spine and/or esophagus is aligned. The feeding apparatus includes a vertically adjustable feeding platform having a feeding surface from which an animal may eat and/or drink and may be oriented at an angle relative to the surface of the ground on which the feeding apparatus is placed. The feeding apparatus includes a vertically adjustable first platform located below the feeding platform and providing a paw surface on which an animal may place its front feet when eating and/or drinking from the feeding platform, the paw surface being located above the surface of the ground on which the feeding apparatus is placed. The feeding apparatus includes a member adjustably connected to the vertically adjustable feeding platform, the member supporting the vertically adjustable feeding platform and providing for vertical adjustment of the feeding platform.

What is needed is a system for feeding pets that is adaptable to a wide range of animals, is easily adjusted, and can accommodate both specialized feeding bowls and any other bowls selected by a user.

Objects and Advantages

Objects of the present invention include the following: providing a feeding station that may be adjusted to adapt to the size of a particular animal; providing a feeding station that securely holds food or water bowls at a selected height; providing a feeding station that can accommodate food/water bowls of several sizes; and providing a method for feeding domestic animals that is conveniently adjustable and minimizes inadvertent spillage of food and water with no special training of the animal. These and other objects and advantages of the invention will become apparent from consideration of the following specification, read in conjunction with the drawings.

SUMMARY OF THE INVENTION

According to one aspect of the invention, a food riser for supporting food or water bowls for an animal comprises:
  a horizontal platform;
  a vertical supporting stand having forwardly-extending feet of a length sufficient to stably support the weight of the horizontal platform in cantilever fashion; and,
  a means of securing the platform at a selected height in the vertical supporting stand.

According to another aspect of the invention, a food riser for supporting food or water bowls for an animal comprises:
  a horizontal platform having a first surface and a second surface, and having a symmetrical outline so that either of the first or second surface may be placed upward, and wherein at least one of the first and second surfaces further comprises a plurality of grooves for holding bowls and securing them from sliding;
  a vertical supporting stand having forwardly-extending feet of a length sufficient to stably support the weight of the horizontal platform and the contents of the bowls; and,
  a means of securing the platform at a selected height in the vertical supporting stand, the means comprising:
    notches in the platform that clasp the vertical supporting stand from the front;
    vertical holes in the platform directly behind the vertical supporting stand; and,
    dowels inserted into the vertical holes and securely contacting the rear surface of the vertical supporting stand.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

The invention provides an adjustable riser for holding food or water bowls at a selected height in order to accommodate pets of different sizes. It further provides a means of securely holding such bowls so they will not be pushed off the riser as the pet feeds, and the holding means further accommodates bowls of different sizes. Despite its relative simplicity of design, the inventive food riser provides a number of innovative convenience and security features and benefits that will become apparent to the typical pet owner.

Figure 5:
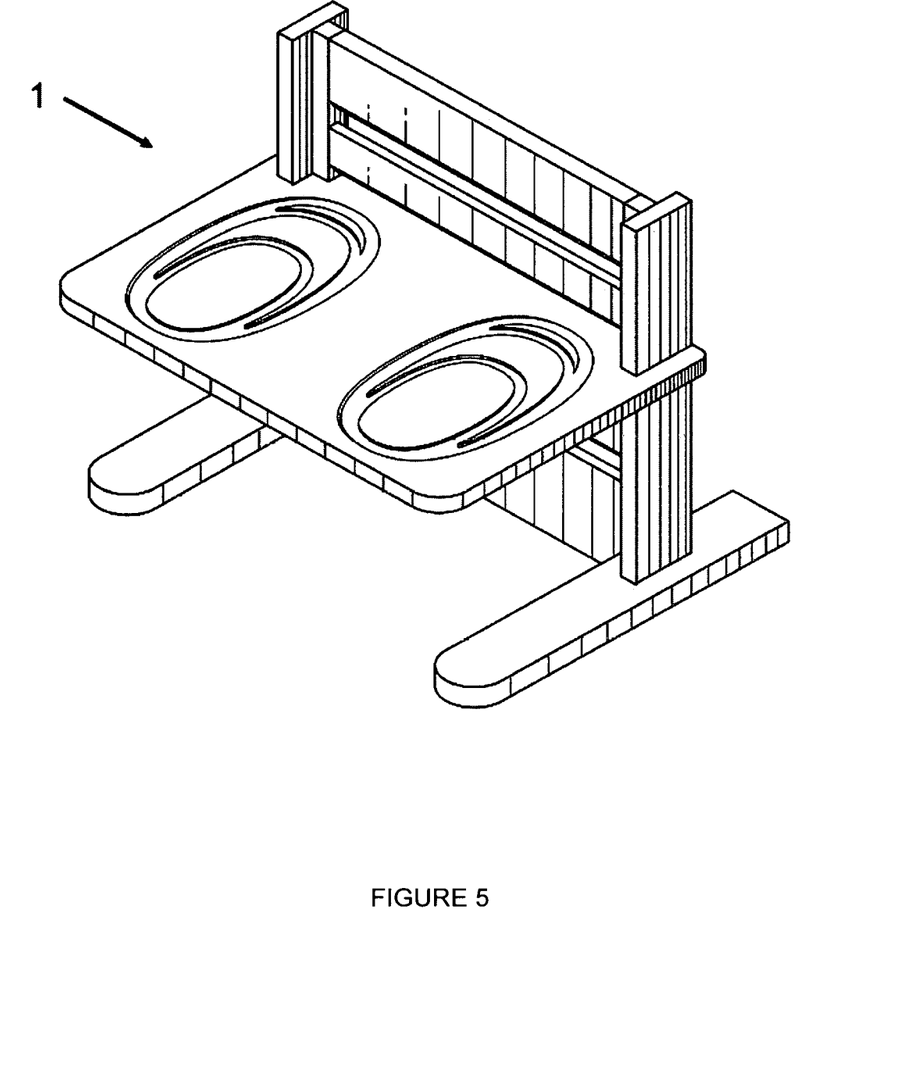
FIG. 5 is a dimetric projection view of the front of a food riser in accordance with some aspects of the invention.
Figure 6:
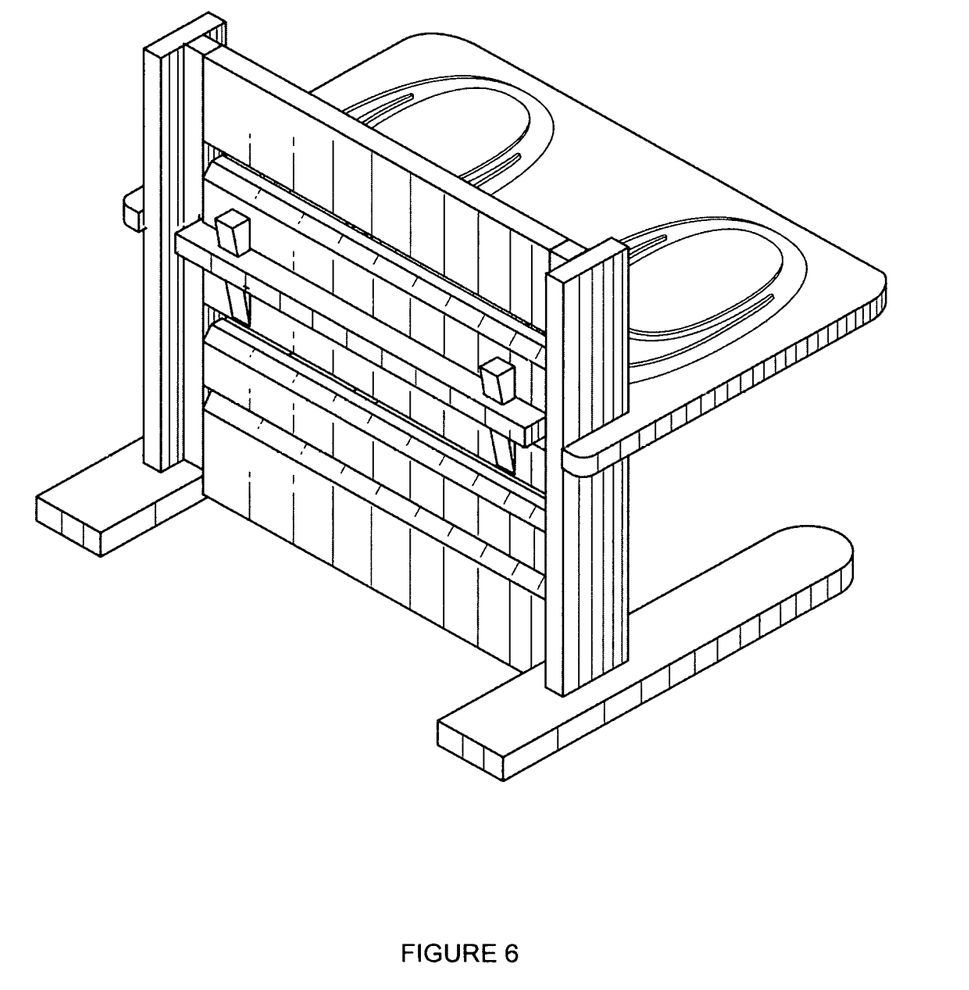
FIG. 6 is a dimetric projection view of the rear of a food riser in accordance with some aspects of the invention.
Figure 7:
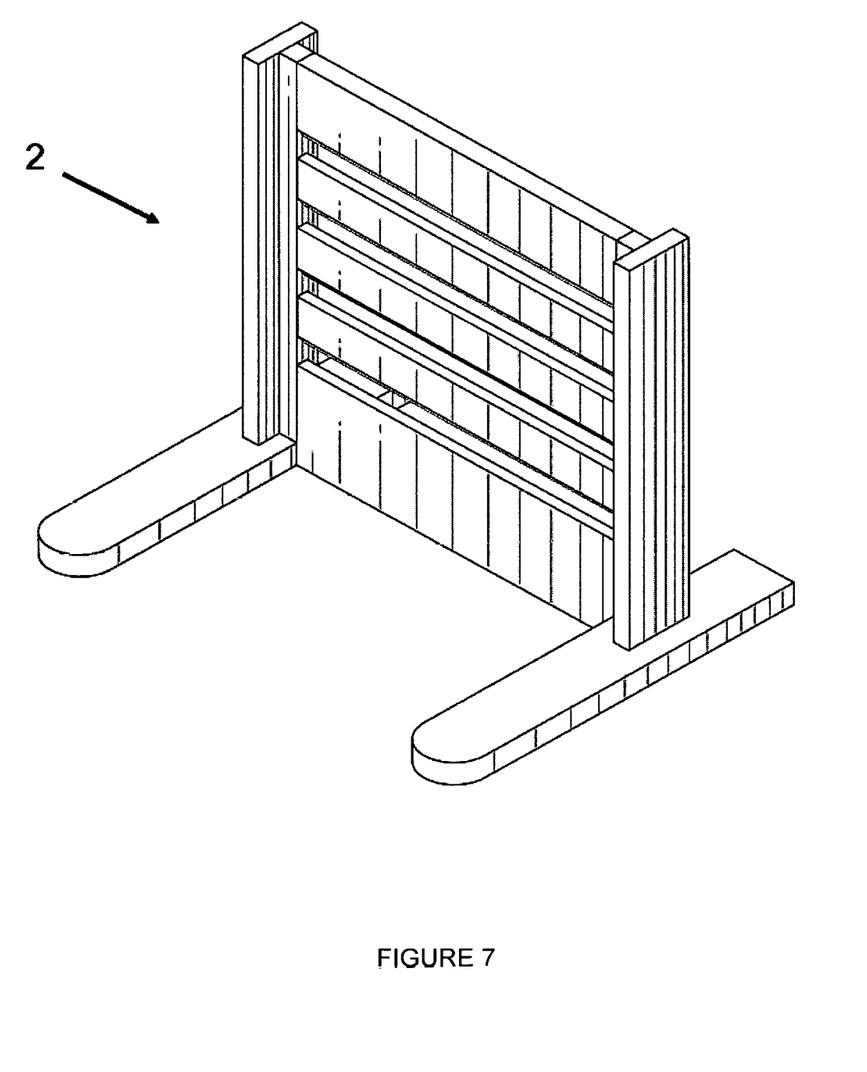
FIG. 7 is a dimetric projection view of the stand portion of a food riser in accordance with some aspects of the invention, viewed from the front.
Figure 8:
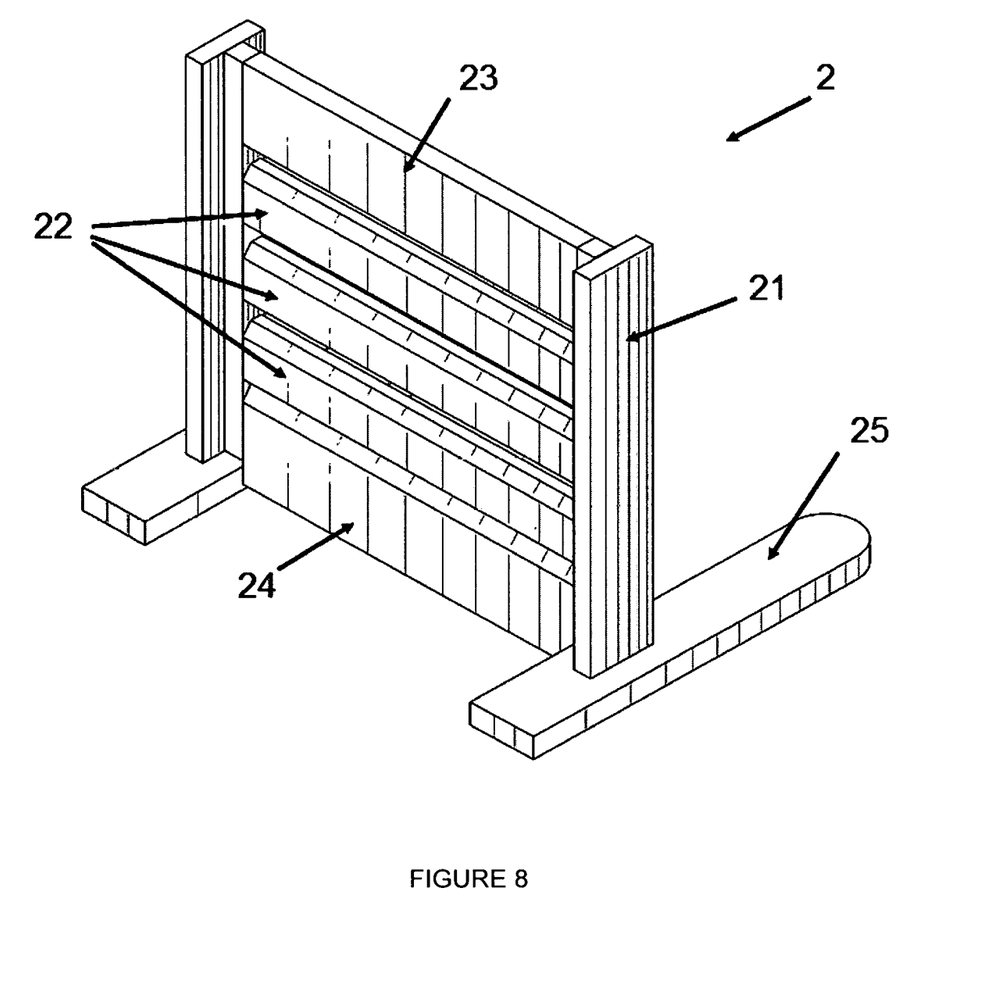
FIG. 8 is a dimetric projection view of the stand portion of a food riser in accordance with some aspects of the invention, viewed from the rear.
Figure 9:
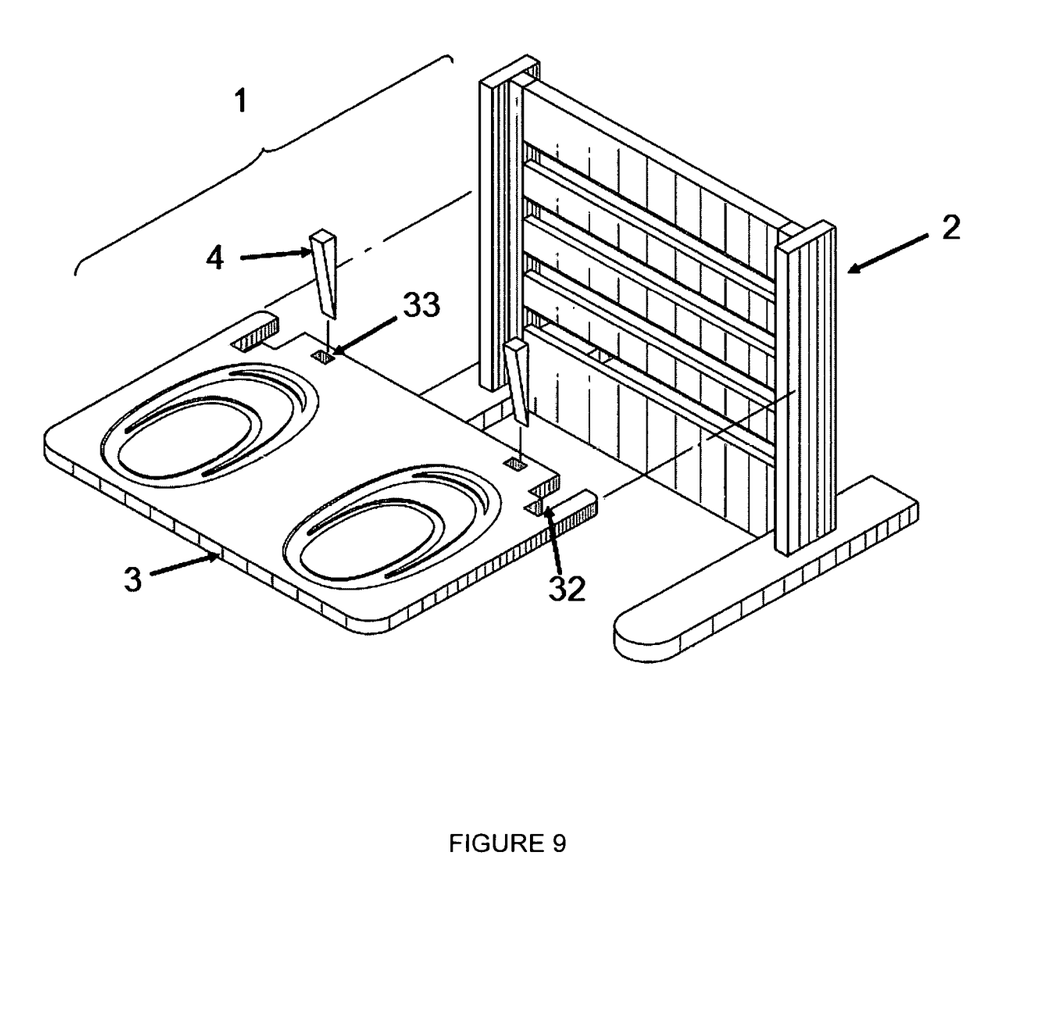
FIG. 9 is an exploded view of a food riser showing the relationship between the stand, platform, and dowels.

The invention 1 includes three basic components: a stand 2 having a plurality of horizontal supporting members at selected heights, a platform 3 that is inserted between two of the horizontal members and supported thereby in cantilever fashion, and one or more dowels 4 inserted on the rear side to lock the platform 3 into position. Orthogonal views of an assembled system are shown in FIGS. 1-4. Perspective views of an assembled system are shown in FIGS. 5-6. Perspective views of the stand portion of the invention are shown in FIGS. 7-8. An exploded view of the system is shown in FIG. 9. The following examples will describe particular features of the various elements of the invention for illustrative purposes.

Example

Turning first to the stand 2, FIGS. 7-8 illustrate some basic characteristics. First, the stand is formed from two vertical members 21 joined together by a plurality of horizontal members 22, 23, 24 to form a generally planar, ladder-like back plate. Horizontal feet 25 extend forward, orthogonal to the plane of the back plate. (As used herein, "forward", "front" and like terms indicate the side and direction in which the platform is mounted to face the animal to be fed.)

Figure 1:
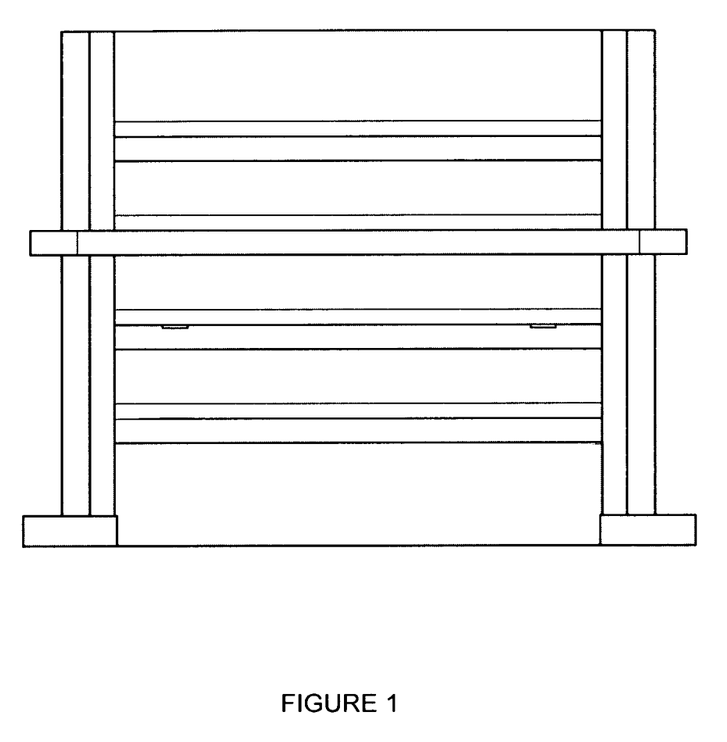
FIG. 1 is a front elevational view of a food riser in accordance with some aspects of the invention.
Figure 2:
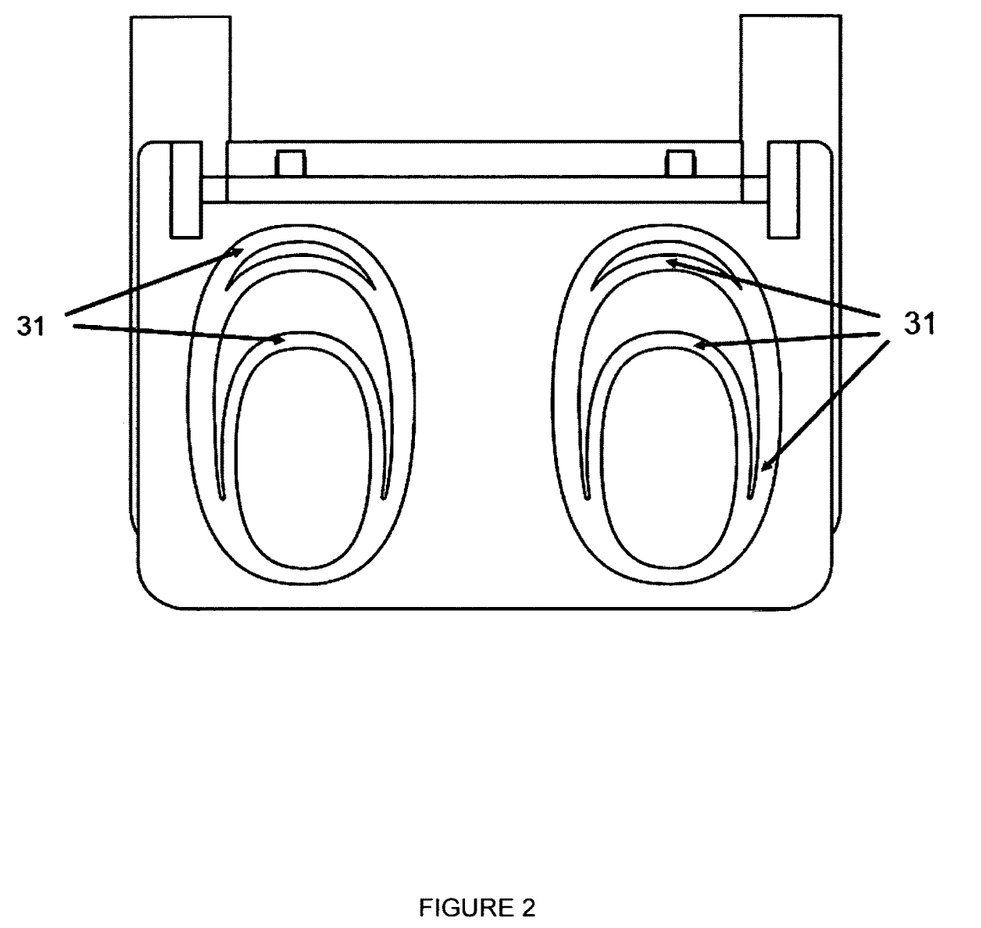
FIG. 2 is a top plan view of a food riser in accordance with some aspects of the invention.
Figure 3:
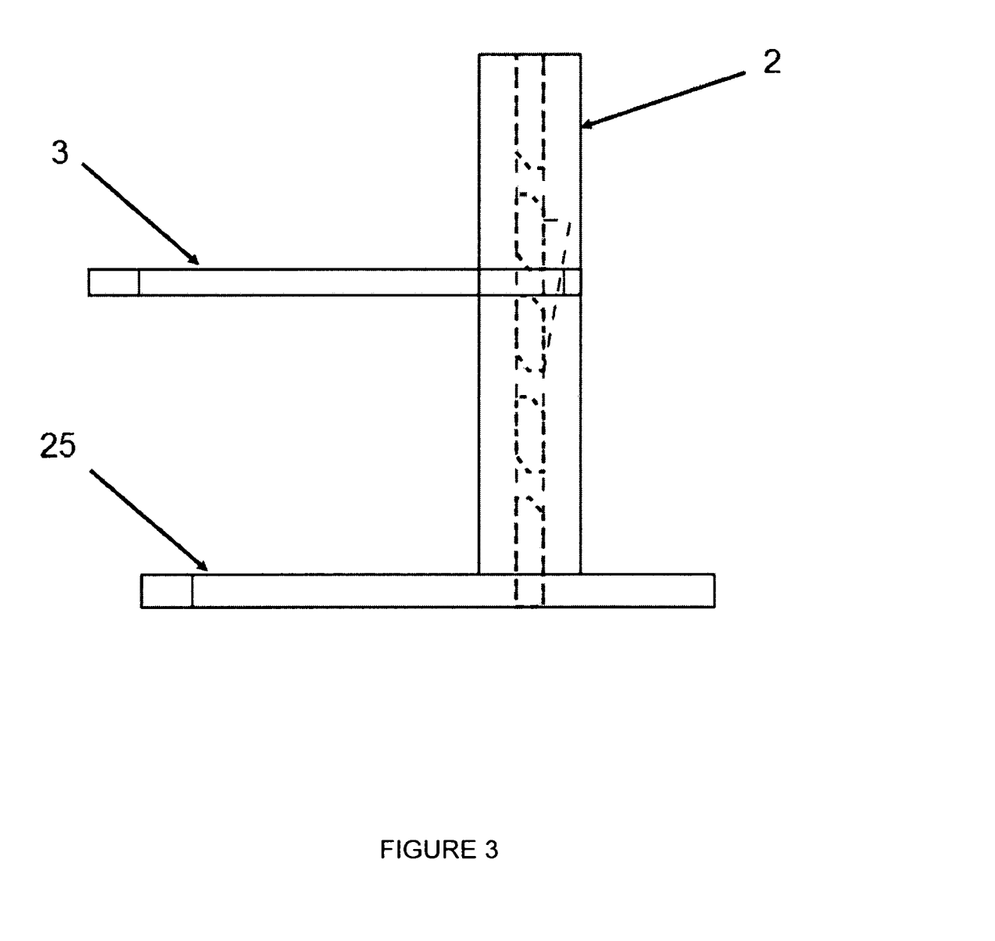
FIG. 3 is a left end elevational view of a food riser in accordance with some aspects of the invention.
Figure 4:
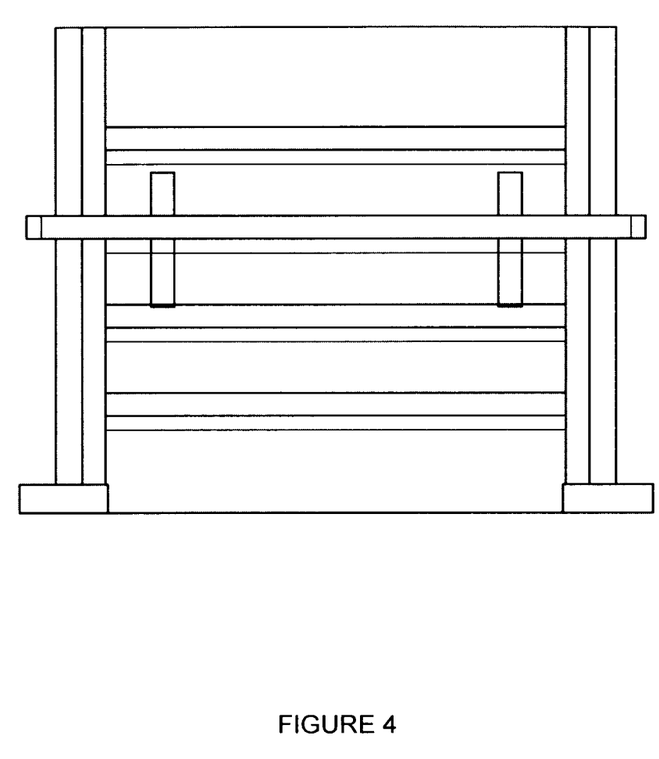
FIG. 4 is a rear elevational view of a food riser in accordance with some aspects of the invention.

It will be appreciated that stand 2 supports platform 3 in cantilever fashion, and therefore feet 25 must extend sufficiently forward of the back plate so that the center of mass of the entire assembly including any bowls, food, and water placed upon the platform will be within the reach of feet 25. The feet, however, need not extend to the entire length of platform 3; and are preferably set back somewhat to reduce trip hazards and prevent the animal's feet from striking them. An example is shown in FIG. 2, where it can be seen that the platform extends somewhat beyond the ends of the feet, but the center of mass of the platform is well within the extent of the feet.

Those familiar with the art of static structural analysis will understand that the relationships between the loaded platform and the supporting feet that will lead to stability or instability are well known and easily analyzed. Specifically, the distribution of the upward reaction force acting on the feet will reflect the distribution of the mass of the platform and its contents. As the center of mass of the load moves forward, the reaction forces will also move forward in order to maintain moment equilibrium and the structure will continue to rest stably upon the floor. If the center of mass moves beyond the ends of the feet, then the reaction forces can no longer maintain moment equilibrium and the structure will tip over. Careful study of FIG. 2 shows that, first, the center of mass of platform 3 is placed well back from the end of the feet 25, and second, the centroids of all the ovals also lie back from the ends of the feet. The structure is therefore stable regardless of the mass of platform 3 and regardless of the mass of any contents placed in the defined ovals. Rotational instability could therefore only arise if a large extraneous load were applied at the front edge of the platform. Even this mode of instability could be eliminated, if desired, simply by making the feet 25 long enough to extend to the front edge of platform 3.

In the example shown in the several Figures, the stand has three horizontal members 22, which along with top and bottom members 23, 24 define four slots so that platform 3 can be placed at any of four height positions. It will be appreciated that any number n of members 22 may be used depending on the number of different heights h desired, where h=n+1 and n must be at least one.

Example

Figure 10:
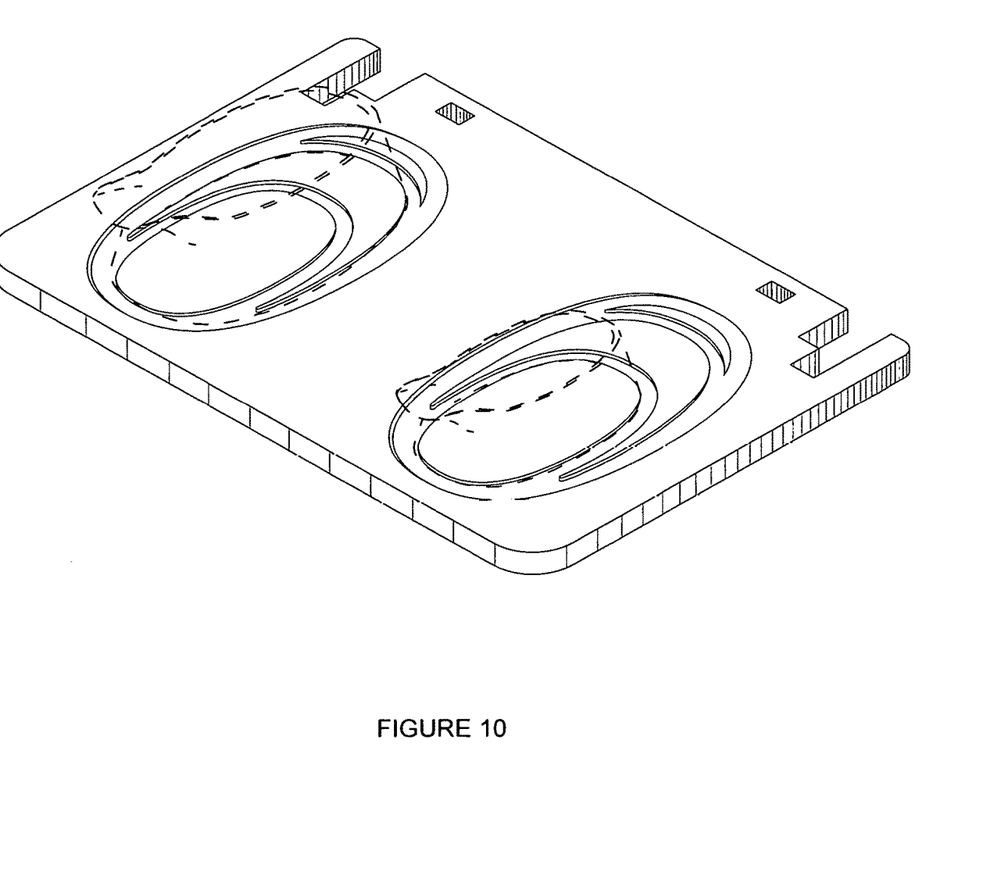
FIG. 10 is a schematic diagram of the platform portion showing the interaction of the platform with food bowls of two different sizes, indicated by dashed lines.

Platform 3 is generally planar, as shown in the various drawings; in FIGS. 2 and 9, e.g., it can be further seen that the platform is bilaterally symmetrical in outline and can therefore be inserted into stand 2 with either surface facing upward. One surface may have, as shown, a series of grooves 31, into which bowls of particular sizes and shapes may be placed, FIG. 10. The grooves prevent the bowls from being pushed around by the animal and thereby eliminate the chances of spillage. In the examples shown, the grooves are elliptical and suitable to accommodate three sizes of bowls such as those described in Applicant's co-pending U.S. patent application Ser. No. 15/998,011, "Animal Feeding Container and Method of Using", dated Jun. 8, 2018 and incorporated herein by reference in its entirety.

As noted earlier, feet 25 must be of sufficient length to stably support the platform and its contents in cantilever fashion. One can see from FIG. 2 that the centroids of the different ellipses are all located within the reach of feet 25. Thus, the entire structure will be stable (i.e., will not tend to tip forward) regardless of the mass of the bowls and their contents. Furthermore, any downforce applied by the animal on the food bowl during the feeding process will likewise be competently resisted by feet 25 because of the length of feet 25 and the relative location of grooves 31. At the same time, location of the smallest groove toward the front and the largest groove toward the back places food and water most conveniently for an animal of a given size and inherently moves larger loads further back and away from the ends of feet 25.

It will be appreciated that the joints where feet 25 are connected to vertical members 21 must resist the bending moment applied by the loaded platform. If desired for a particular application, the joints may be further strengthened by any conventional means, such as metal fasteners, braces, triangular gussets, etc., as are well known in the art.

Because platform 3 is reversible, it may be provided with grooves 31 on one side while the other side may be smooth or may have a second set of grooves to accommodate, e.g., circular dishes of various sizes. In any case, the pattern of grooves will be such that objects placed in the grooves will be held within the stability constraints provided by feet 25.

Example

Figure 11:
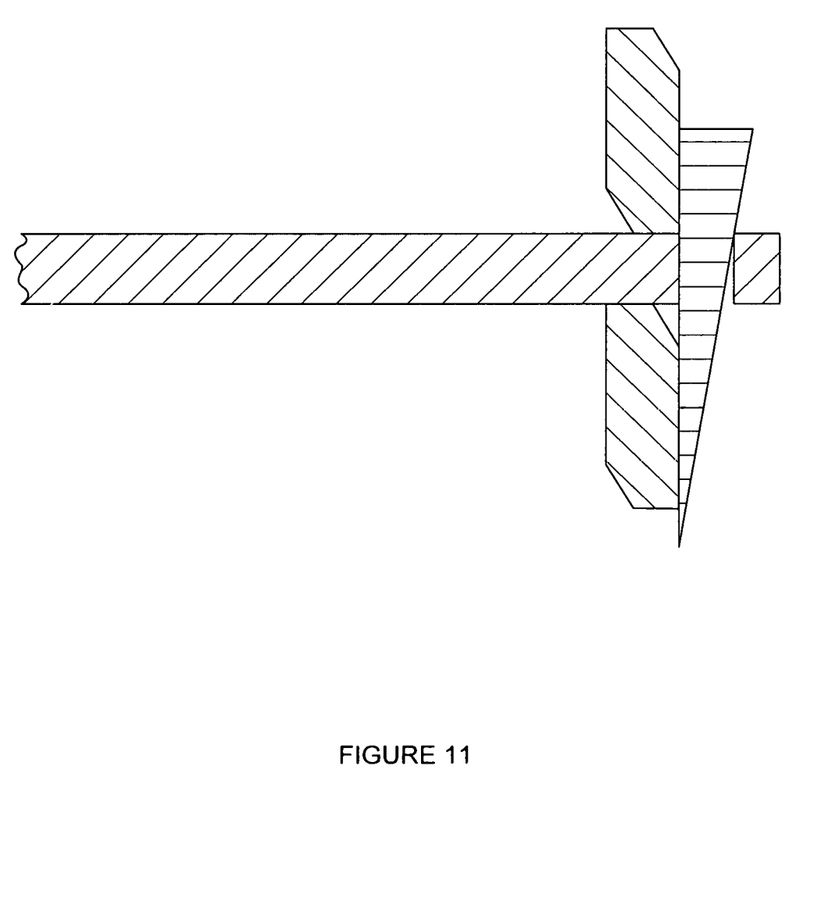
FIG. 11 is a cross-sectional view showing how the platform portion rests on the flats of the horizontal supports and is held in position by the dowel.

As noted, platform 3 is supported in cantilever fashion by stand 2. The cantilever effect is accomplished through the following: Platform 3 has notches 32 (FIG. 9) near both sides that engage upright members 21, and has holes 33 into which dowels 4 are inserted. From the plan view, FIG. 3, it can be seen that the distance between holes 33 and notches 32 is just sufficient to place the holes directly behind the horizontal supports, so that when dowels 4, which are preferably tapered, are inserted, platform 3 is drawn fast against uprights 21 and dowels 4 to form a moment-resistive connection. A cross sectional view of the connection is presented schematically in FIG. 11

Example

The invention is intended to provide two degrees of adaptability to the size of the animal, viz., adjustable height and accommodation of variously sized food and water bowls. It is therefore contemplated that a user may wish to change the height of the platform from time to time. To make this process more convenient, Applicant has found that horizontal supports 22 may be selectively chamfered as indicated by hidden lines in FIG. 3 and shown in more detail by reference to FIG. 11. Each support 22 is chamfered on the rear of its upper edge and the front of its lower edge. Top member 23 is only chamfered on its front lower edge and bottom member 24 is only chamfered on its rear upper edge. It can be seen that the chamfers allow platform 3 to be more easily guided into the slot, and once in position it rests on the flat surfaces of the supports. Because the material removed in the chamfered areas represents the region of lowest force, the chamfers have virtually no effect on the overall load-bearing capability of the connection after assembly and placement of the dowels. The chamfers can be virtually any angle, but are preferably 15 to 30° from vertical and are of such a size that the horizontal portion of the contact surface is at least half the thickness of the support 22.

Example

The inventive riser may be constructed of any conventional material by any convenient means. Applicant has found that the riser may be fabricated from wood and rely on conventional dowel connections so that the entire structure can be stored and shipped flat and quickly assembled by the user without any special tools or hardware.

Alternatively, the riser may be a polymer or polymer composite and may be fabricated by injection molding or other processes as are familiar in the field of plastic ware. If the riser is made from a polymer, vertical member 21 and foot 25 may be made as a single unit with a selected radius in the right angle joint, for added moment resistance as discussed above.

I claim:

1. A food riser for supporting food or water bowls for an animal comprising:
   a horizontal platform,
      wherein said platform comprises a first surface and a second surface, and said platform may be inserted into said slots with either of said first or said second surface facing upward, and,
      wherein at least one of said first and second surfaces of said platform comprises a plurality of grooves into which a user may place bowls of selected sizes and shapes so that said bowls will be constrained from moving horizontally;
   a vertical supporting stand having vertical and horizontal members forming a generally planar structure defining a plurality of slots at various heights into which said platform can be inserted, and further having forwardly-extending feet of a length sufficient to stably support the weight of said horizontal platform in cantilever fashion; and,
   a moment-resistant means of securing said platform in a selected slot in said vertical supporting stand.

2. The food riser of claim 1 wherein said plurality of grooves are located such that the centroid of a bowl fitted to any individual groove will be located closer to said supporting stand than are said forwardly-extending ends of said feet.

3. The food riser of claim 1 wherein said plurality of grooves are disposed to constrain a smaller bowl in a more forward position on said platform and constrain a larger bowl in a more rearward position on said platform.

4. The food riser of claim 1 wherein said horizontal members are chamfered on selected exposed edges to facilitate the insertion of said platform into said slots.

5. The food riser of claim 1 wherein said platform comprises notches on the rear edge thereof to engage said vertical members.

6. The food riser of claim 5 wherein said platform comprises a plurality of through holes into which dowels are inserted on the rear side of said vertical supporting stand to secure said notches against said vertical members.

7. A food riser for supporting food or water bowls for an animal comprising:
   a horizontal platform having a first surface and a second surface, and having a symmetrical outline so that either of said first or second surfaces may be placed upward, and wherein at least one of the first and second surfaces further comprises a plurality of grooves into which a user may place bowls so that said bowls are secured from sliding;
   a vertical supporting stand defining a plurality of horizontal slots into which said platform may be inserted and further having forwardly-extending feet of a length sufficient to stably support the weight of said horizontal platform, said bowls, and any contents of said bowls; and,
   a means of securing said platform in a selected slot in said vertical supporting stand, said means comprising:

notches in said platform that clasp said vertical supporting stand from the front;

vertical holes in said platform directly behind said vertical supporting stand; and, dowels inserted into said vertical holes and securely contacting the rear surface of said vertical supporting stand.

8. The food riser of claim 7 wherein said plurality of grooves on said platform are located such that the centroid of a bowl fitted to any individual groove will be located closer to said supporting stand than are said forwardly-extending ends of said feet.

9. The food riser of claim 8 wherein said plurality of grooves are disposed to constrain a smaller bowl in a more forward position on said platform and constrain a larger bowl in a more rearward position on said platform.

10. The food riser of claim 7 wherein selected horizontal edges of the supporting members defining said slots are chamfered in order to facilitate the insertion of said horizontal platform into said slots.

* * * * *